(12) United States Patent
Kubota et al.

(10) Patent No.: US 7,493,529 B2
(45) Date of Patent: Feb. 17, 2009

(54) IMAGE DISPLAY DEVICE AND ERROR HANDLING METHOD FOR IMAGE DISPLAY DEVICE

(75) Inventors: Mitsuru Kubota, Matsumoto (JP); Yasuhiro Nakamura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 675 days.

(21) Appl. No.: 11/006,648

(22) Filed: Dec. 8, 2004

(65) Prior Publication Data
US 2005/0231639 A1 Oct. 20, 2005

(30) Foreign Application Priority Data
Apr. 20, 2004 (JP) .............................. 2004-124247

(51) Int. Cl.
*G06F 11/00* (2006.01)
(52) U.S. Cl. ........................... 714/57; 348/552; 348/569
(58) Field of Classification Search .................... 714/57
See application file for complete search history.

(56) References Cited

U.S. PATENT DOCUMENTS 7,199,891 B1 * 4/2007 Ihara ......................... 358/1.15

2002/0060748 A1 * 5/2002 Aratani et al. .............. 348/552
2002/0062487 A1 * 5/2002 Ohno et al. ................. 725/133
2004/0057767 A1 * 3/2004 Parry ........................... 400/74
2004/0252236 A1 * 12/2004 Yamada et al. ............. 348/552

FOREIGN PATENT DOCUMENTS

| JP | A-2001-353854 | 12/2001 |
| JP | A-2002-158976 | 5/2002 |
| JP | A-2002-281406 | 9/2002 |
| JP | A-2003-219353 | 7/2003 |

* cited by examiner

*Primary Examiner*—Yolanda L Wilson
(74) *Attorney, Agent, or Firm*—Oliff & Berridge PLC (57) ABSTRACT

Exemplary embodiments provide an image display device capable of preventing an error image displayed on the screen from interfering with the user watching TV broadcasting when the power supply is cut or a print error occurs during printing of image data, and an error handling method. A screen shows a state where a print error occurs while the user is watching TV broadcasting by returning the screen to a TV screen after printing of an image. A simple error image, indicating a print error can be displayed on the screen and the user can select whether a simple error image is to be turned off or an error detail information image is to be displayed. When the user wishes to defer the handling of the print error, he can turn off the simple error image by selecting an "Exit" key on the remote controller.

12 Claims, 10 Drawing Sheets

[Power] OFF

IMAGE DISPLAY DEVICE AND ERROR HANDLING METHOD FOR IMAGE DISPLAY DEVICE

BACKGROUND

Exemplary embodiments relate to an image display device furnished with an error indication function and an error handling method for an image display device.

Related art image display devices connected to a printer capture and print an image on the TV screen, so that a user can see in detail or save a particular image among images of TV broadcasting. With such an image display device, the user can watch normal TV broadcasting while an image is printed by switching the print setting screen to the TV broadcasting screen.

In some cases, however, when a print error, such as paper jamming and empty ink, occurs during printing, the user keeps watching TV broadcasting without noticing the print error. Hence, there has been disclosed a technique of notifying the user of a print error by displaying a large dialog box on the screen on which TV broadcasting is being displayed upon occurrence of the print error, see, e.g., Japanese Patent Publication No. JP-A-2003-219353.

SUMMARY

The image display device described in JP-A-2003-219353, however, keeps displaying an error image in the form of a dialog box to notify the user of the print error on the screen unless the user handles the print error to restore normal operation. Even when the user wishes to keep watching TV broadcasting by deferring a job of clearing the print error, there is a problem that the dialog box displayed on the screen interferes with the user watching TV broadcast.

Exemplary embodiments provide an image display device capable of, generally, preventing an error image displayed on the screen from interfering with the user watching TV broadcasting when the power supply is cut or a print error, such as paper jamming and/or empty ink, occurs during printing of image data, such as a capture image; and an error handling method for an image display device.

In order to achieve the above and other objects, an image display device, used with a printer and at least one or more selecting devices, of the exemplary embodiments includes a display portion on which an image including TV broadcasting is displayed; a memory to store image data of the image displayed on the display portion; a display control portion to display an error message, when an error occurs in the printer used to print the image data recorded in the memory, the error image indicating an occurrence of the error on the display portion; and a first selecting device to allow a user to turn off the error image, the display control portion turning off the error image displayed on the display portion following a turn-off command from the first selecting device while information of the error is saved.

According to this configuration, not only can an error image be displayed on the display portion when a print error occurs, but also the error image can be turned off temporarily. The user can therefore watch TV broadcasting without the error image interfering with the user when he wishes to defer the handling of the print error.

For the image display device of exemplary embodiments of the invention, the image display device further includes a second selecting device to allow the user to select to display an error detail information image; the error image being a simple error image; the first selecting device allowing the user to turn off the simple error image; and the display control portion performing processing following a command corresponding to a selection content from the first or the second selecting device.

According to this configuration, when a print error occurs, the first or second selecting device allows the user to select whether the simple error image is to be turned off or the error detail information image is to be displayed. Hence, when the user wishes to defer the handling of the print error, he can turn off the simple error image, and when he wishes to handle the print error, he can display the error detail information image.

For the image display device of exemplary embodiments of the invention, it is desirable that the display control portion displays the simple error image on the display portion in a predetermined area other than a center portion.

According to this configuration, because the simple error image is displayed on the display portion in a predetermined area other than the center portion, it is possible to prevent the simple error image from interfering with the user watching TV broadcasting.

For the image display device of exemplary embodiments of the invention, it is desirable that the image display device further include an external memory device, and that the image include an image based on image data read out from the external memory device.

According to this configuration, the image is not limited to image data of TV broadcasting, but includes image data read out from an external memory device, which enables a broad range of image data to be printed.

For the image display device of exemplary embodiments of the invention, it is desirable to further include: a power supply switch to shut OFF a power supply of the image display device, power supplies of the display portion and the printer being shut OFF in association with switching OFF of the power supply switch; and a power supply control portion to control the power supply of the image display device when the power supply switch is switched OFF, the power supply control portion upon determining that the printer is executing a print job when the power supply switch is switched OFF, the display control portion displaying a warning image indicating that the print job is being executed on the display portion, and issuing a command to the power supply control portion not to shut OFF the power supply of the image display device.

According to this configuration, when the power supply switch is switched OFF during a print job, a warning image is displayed and the power supply is not shut OFF. Hence, even when the power supply switch is switched OFF erroneously, the print job can be executed to the end without being suspended.

For the rear projector of exemplary embodiments of the invention, it is desirable that the display control portion displays the error image again on the display portion in a case where the information of the error is saved when the power supply switch is switched OFF while the error image is kept turned off.

According to this configuration, when the user forgets that he has not handled the print error and switches OFF the power supply switch after he turned off the error image on the screen by deferring the handling of the print error, the power supply is not shut OFF and the error image is displayed again. This allows the user to handle the print error to let the print job be continued before the power supply is shut OFF.

For the image display device of exemplary embodiments of the invention, it is desirable to further include: a third selecting device to allow the user to select to let the print job be continued when the power supply switch is switched OFF, and a fourth selecting device to allow the user to shut OFF the power supply of the image display device, the display control portion performing processing following a command corresponding to a selection content from the third or the fourth selecting device.

According to this configuration, when the power supply switch is switched OFF, the third or fourth selecting device allows the user to select whether the print job is to be continued or the power supply is to be shut OFF. Hence, when the user wishes the printing to be continued, the printing is continued, and when he wishes to shut OFF the power supply, he can cancel the print job and shut OFF the power supply.

For the image display device of exemplary embodiments of the invention, it is desirable to further include: a fifth selecting device to allow the user to select to shut OFF the power supply of the image display device and a sixth selecting device to allow the user to select not to shut OFF the power supply when the power supply switch to shut OFF the power supply of the image display device is switched OFF while the image data is recorded in the memory, the display control portion displaying, when the power supply switch is switched OFF, a warning image indicating that the image data is accumulated in the memory, and performing processing following a command corresponding to a selection content from the fifth or the sixth selecting device.

According to this configuration, when the power supply switch is switched OFF, a warning image indicating that the image data is accumulated in the memory is displayed, and the fifth or sixth selecting device allows the user to select whether the power supply is to be shut OFF or not. Hence, when the image data recorded in the memory may be erased, the power supply is shut OFF, and when the user does not wish to erase the image data, the power supply is not shut OFF.

For the image display device of exemplary embodiments of the invention, it is desirable to further include an error notifying portion, provided apart from the display portion, to notify, when an error occurs in the printer, the user of an occurrence of the error.

According to this configuration, because the occurrence of a print error is indicated on the error notifying portion even after the error indication displayed on the display portion was turned off, the power supply will not be shut OFF unless printing is completed. It is thus possible to provide an easy-to-use image display device.

Exemplary embodiments of the invention are not limited to an apparatus as has been described, and can be achieved as a method.

DETAILED DESCRIPTION OF EMBODIMENTS

Hereinafter, a first exemplary embodiment of a rear projector as an image display device of exemplary embodiments of the invention will be described with reference to the drawings.

Figure 1:
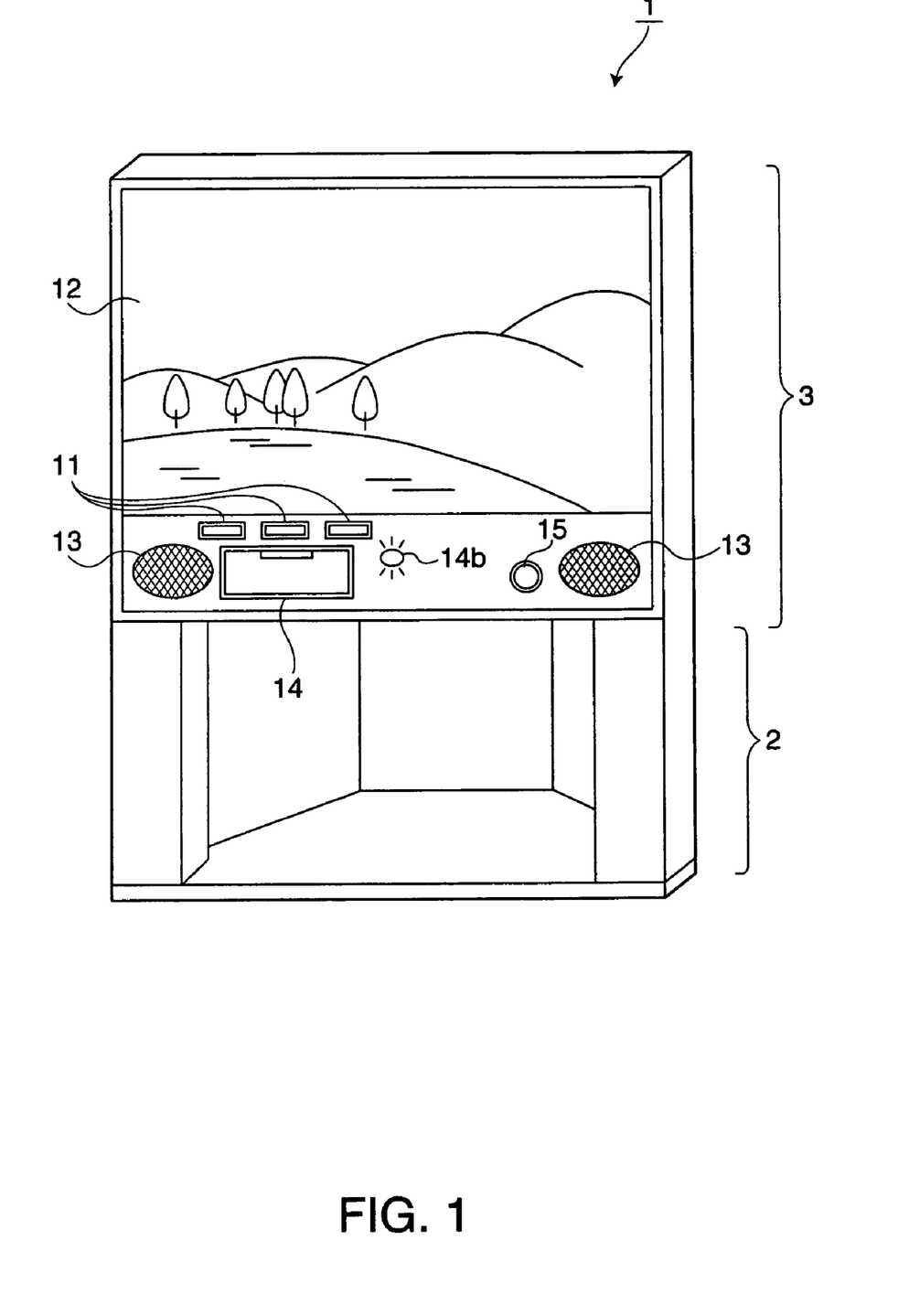
FIG. 1 is a schematic perspective view showing a configuration of a rear projector according to a first exemplary embodiment.

FIG. 1 is a schematic perspective view showing the configuration of a rear projector of this exemplary embodiment. Hereinafter, the configuration of a rear projector 1 of this exemplary embodiment will be described with reference to FIG. 1. The rear projector 1 of this exemplary embodiment includes a stand 2 and a main body 3.

The main body 3 includes a memory card slot 11 as an external memory device, a display portion 12, speakers 13, a printer 14, and a main power supply switch 15.

The memory card slot 11 includes an outlet to receive various kinds of memory cards (not shown), and is provided at the lower portion of the main body 3. The memory card slot 11 is used to read out, for example, image data taken by a digital camera and stored in a memory card.

The display portion 12 displays an image of TV broadcasting, an image based on image data read out from the memory card slot 11, and an image based on image data inputted from various kinds of input terminals (not shown).

The speakers 13 are used to output, for example, sounds of TV broadcasting. The speakers 13 are provided at the right and the left in the lower portion of the main body 3 to output stereophonic sounds.

The printer 14 is used to print, for example, a capture image obtained by capturing a TV image, and image data read out from the memory card slot 11 (for example, image data taken by a digital camera). An error indication lamp 14b, serving as an error notifying portion to notify the user of the occurrence of a print error while the printer 14 is executing printing, is provided in the vicinity of the printer 14. The error indication lamp 14b includes, for example, an LED (Light Emitting Diode).

The main power supply switch 15 is used for ON/OFF of the power supply of the overall rear projector 1.

Figure 2:
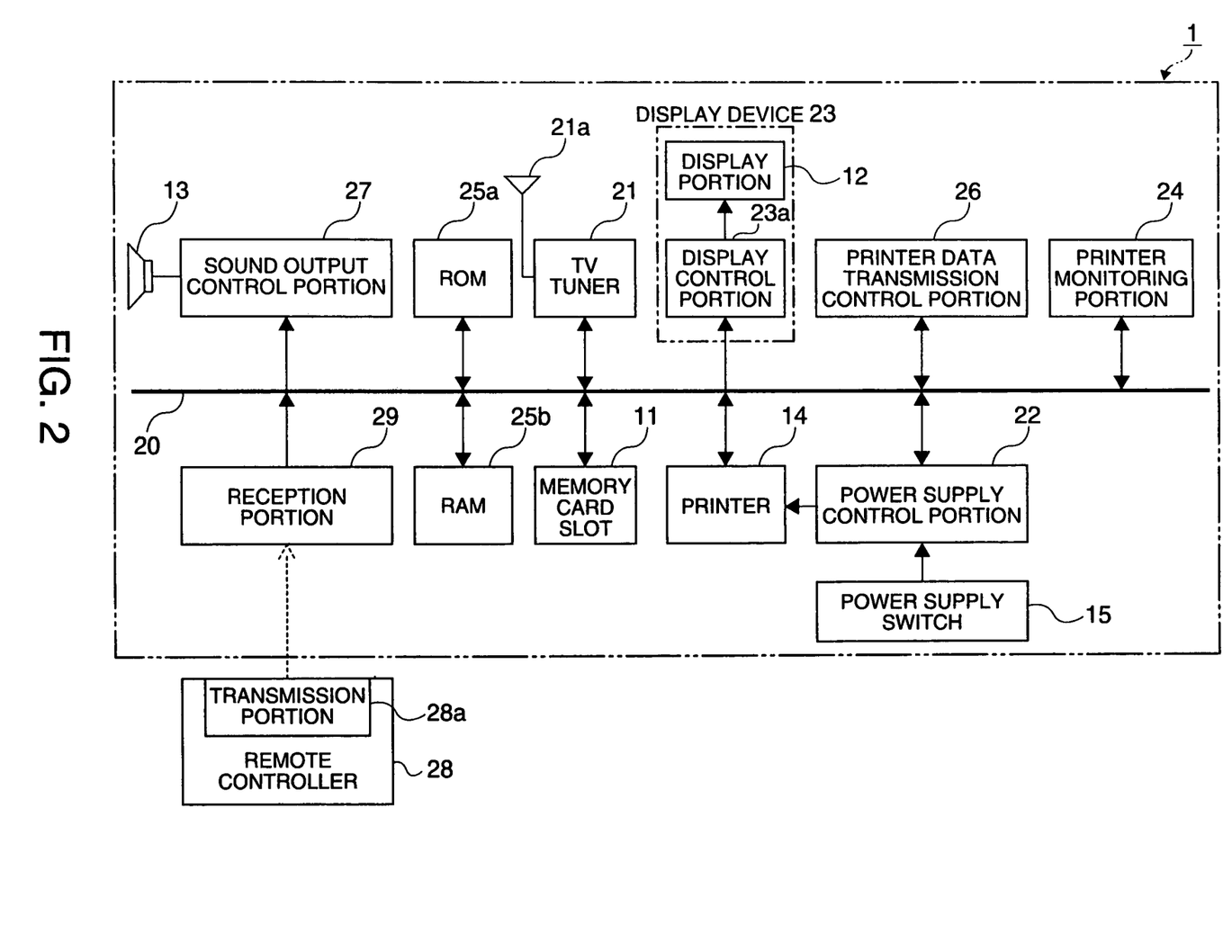
FIG. 2 is a schematic showing the circuit configuration of the rear projector.

FIG. 2 is a block diagram showing the circuit configuration of the rear projector. Hereinafter, the circuit configuration of the rear projector will be described with reference to FIG. 2. The rear projector 1 includes an antenna 21a, a TV tuner 21, the memory card slot 11, a power supply control portion 22, the power supply switch 15, a display device 23, the printer 14, a printer monitoring portion 24, a printer data transmission control portion 26, a ROM 25a, a RAM 25b, a sound output control portion 27, and a reception portion 29. The TV tuner 21, the memory card slot 11, the power supply control portion 22, the display device 23, the printer 14, the printer monitoring portion 24, the printer data transmission control portion 26, the ROM 25a, the RAM 25b, the sound output control portion 27, the reception portion 29 are interconnected to each other via a bus 20.

The TV tuner 21 is used to receive, for example, a terrestrial TV broadcasting signal. The antenna (VHF/UHF) 21a is connected to the TV tuner 21 for the signal to be received.

Reception of TV broadcasting is not limited to a method using the antenna 21a, and TV broadcasting may be received via a TV broadcasting cable.

The memory card slot 11 reads out image data stored in a memory card.

The main power supply switch 15 is connected to the power supply control portion 22, and is used for ON/OFF of the power supply of the overall rear projector 1 and the power supply of the printer 14.

The display device 23 includes a display control portion 23a and the display portion 12.

The display control portion 23a converts received TV broadcasting or an image signal read out from a memory card to display data by applying image processing conforming to the type of signal. The converted image data is subjected to image processing, such as gamma correction. Further, the display control portion 23a writes one frame of image data into the RAM 25b when it captures an image on the TV screen displayed on the display portion 12 as a capture image.

In addition, the display control portion 23a reads out image data to be displayed on the display portion 12 from the RAM 25b or the memory card slot 11 to apply image processing. The ROM 25a has stored, for example, data for OSD (On Screen Display) display, or data for a dialog box, and each item of data is read out from the ROM 25a when necessary upon occurrence of an error in the printer 14 or the like, and is displayed on the display portion 12 by the display control portion 23a. The display portion 12 is a liquid crystal projector display portion, and although it is not shown in the drawing, it includes a lamp as a light source, a liquid crystal light valve, a screen, etc. A light emitted from the lamp as the light source passes through the liquid crystal light valve to form an image. The image is then enlarged by a projection lens and projected from the backside of the screen of the display portion 12 to be displayed thereon.

In addition, the display control portion 23a turns off an error image (simple error image) from the screen of the display portion 12 and further displays a detailed error image (error detail information image) on the screen by following a command from a remote controller 28 used as first through sixth selecting device.

The printer 14 prints the capture image or the image data read out from a memory card.

The printer monitoring portion 24 monitors the printing state of the printer 14. For example, the printer monitoring portion 24 periodically obtains information as to whether the printer 14 is in the state of "printing", "print standby", or "print error".

The printer data transmission control portion 26 controls transmission of image data to the printer 14 in response to the state of the printer 14 being monitored by the printer monitoring portion 24. For example, when the printer 14 is in the "print standby" state, it reads out image data from the RAM 25b and transmits the image data to the printer 14. When the printer 14 is in the "printing" or "print error" state, it does not transmit image data to the printer 14 because the printer 14 is executing printing.

In addition to data for the OSD display, a program run by an unillustrated CPU and other kinds of data have been written into the ROM 25b.

The RAM 25b not only stores the capture image temporarily, but is also used as a work area for the unillustrated CPU.

The sound output control portion 27 outputs sound data in the terrestrial TV reception signal received at the TV tuner 21 to the speakers 13 through an amplifier.

The transmission portion 28a provided to the remote controller 28 transmits various kinds of command signals operated on the remote controller 28 to the reception portion 29. The reception portion 29 receives the command signals transmitted from the transmission portion 28a. For example, channels of TV broadcasting are switched or a volume of sounds outputted from the speakers is turned up/down by the command signals thus received. In addition, the remote controller 28 is used as selecting device, and the user is able to select and execute various options for the selected image displayed on the display portion 12 by operating the keys.

The rear projector 1 is configured to switch the screen to TV broadcasting for the user to watch while the printer 14 is printing image data.

Figure 3:
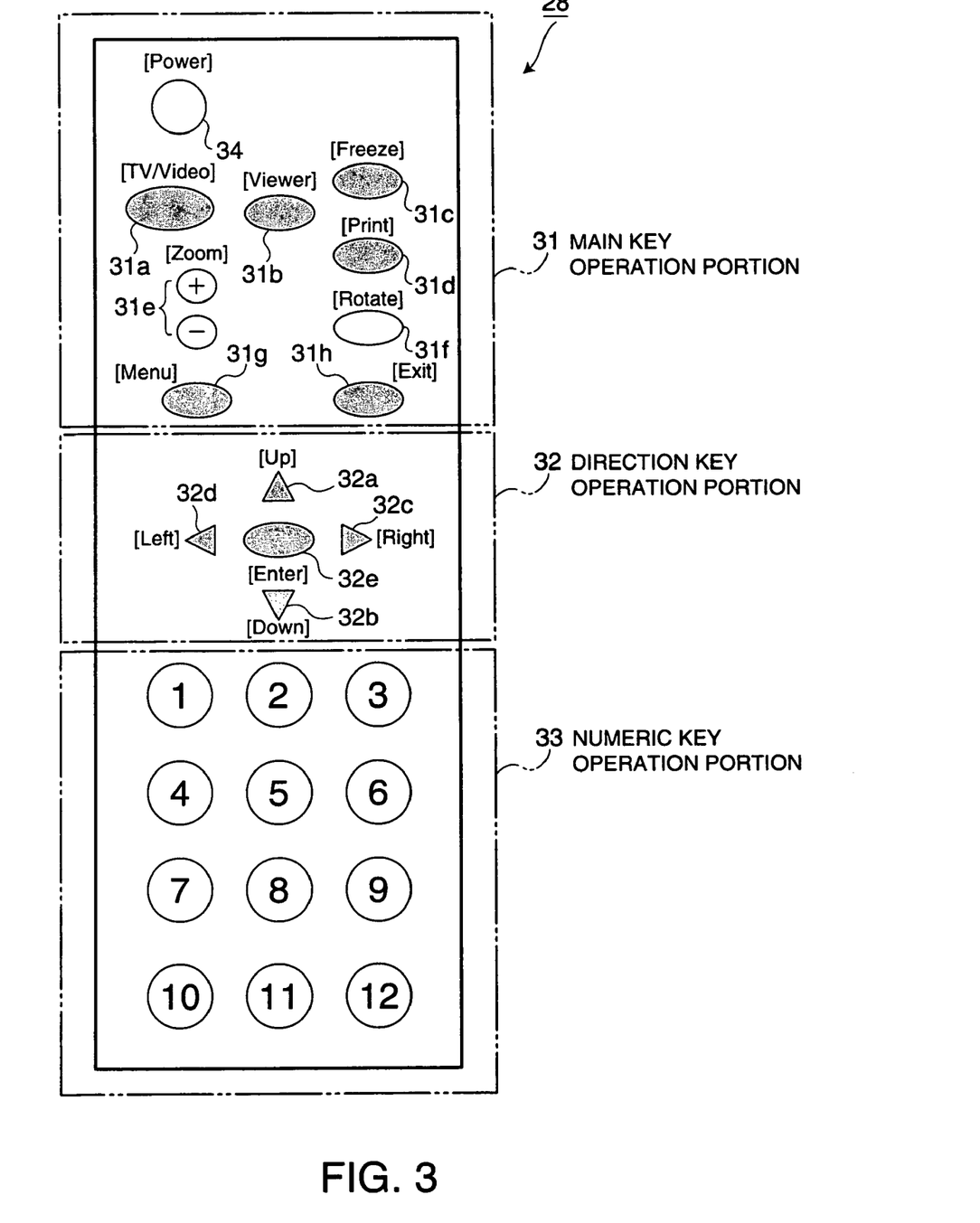
FIG. 3 is a schematic plan view showing a remote controller of the rear projector.

FIG. 3 is a schematic plan view showing the remote controller used to operate the functions of the rear projector. Hereinafter, the remote controller 28 will be described with reference to FIG. 3. The remote controller 28 includes a main key operation portion 31, a direction key operation portion 32, and a numeric key operation portion 33.

The main key operation portion 31 includes a power supply switch ("Power") 34, a "TV/Video" button 31a, a "Viewer" button 31b, a "Freeze" button 31c, a "Print" button 31d, a "Zoom" button 31e, a "Rotate" button 31f, a "Menu" button 31g, and an "Exit" button 31h.

The power supply ("Power") 34 is used for ON/OFF of the main power supply of the rear projector 1 and the power supply of the printer 14.

The "TV/Video" button 31a is used to switch, for example, between a TV broadcasting display and an image of the video inputted via an external input terminal.

The "Viewer" button 31b is used to display image data read out from the memory card slot 11.

The "Freeze" button 31c is used to capture, for example, an image of TV broadcasting displayed on the display portion 12.

The "Print" button 31d is used to print the capture image or an image read out from a memory card.

The "Zoom" button 31e is used to scale up/down the capture image or the like displayed on the display portion 12. Scaling up/down is performed by operating a "+" button and a "−" button.

The "Rotate" button 31f is used to rotate the image on display.

The "Menu" button 31g is used to display a menu screen to make detailed settings of the rear projector 1.

The "Exit" button 31h is used for an operation to return to the previous screen from the screen currently displayed on the display portion 12.

The direction key operation portion 32 includes an "Up" button 32a, a "Down" button 32b, a "Right" button 32c, a "Left" button 32d, and an "Enter" button 32e. The respective buttons are operated when images displayed on the display portion 12 are selected, or the settings are selected.

The numeric key operation portion 33 includes numeric buttons from "1" to "12". The numeric buttons are used when TV channels are switched.

A TV broadcasting channel switching operation, a TV image capturing operation, an image data printing operation, and an operation to display an image captured from a memory card can be achieved at a location away from the rear projector 1 by operations on the remote controller 28.

The respective buttons on the remote controller 28 are used to select various options (displayed buttons or the like) for the selected image displayed on the display portion 12.

Figure 4:
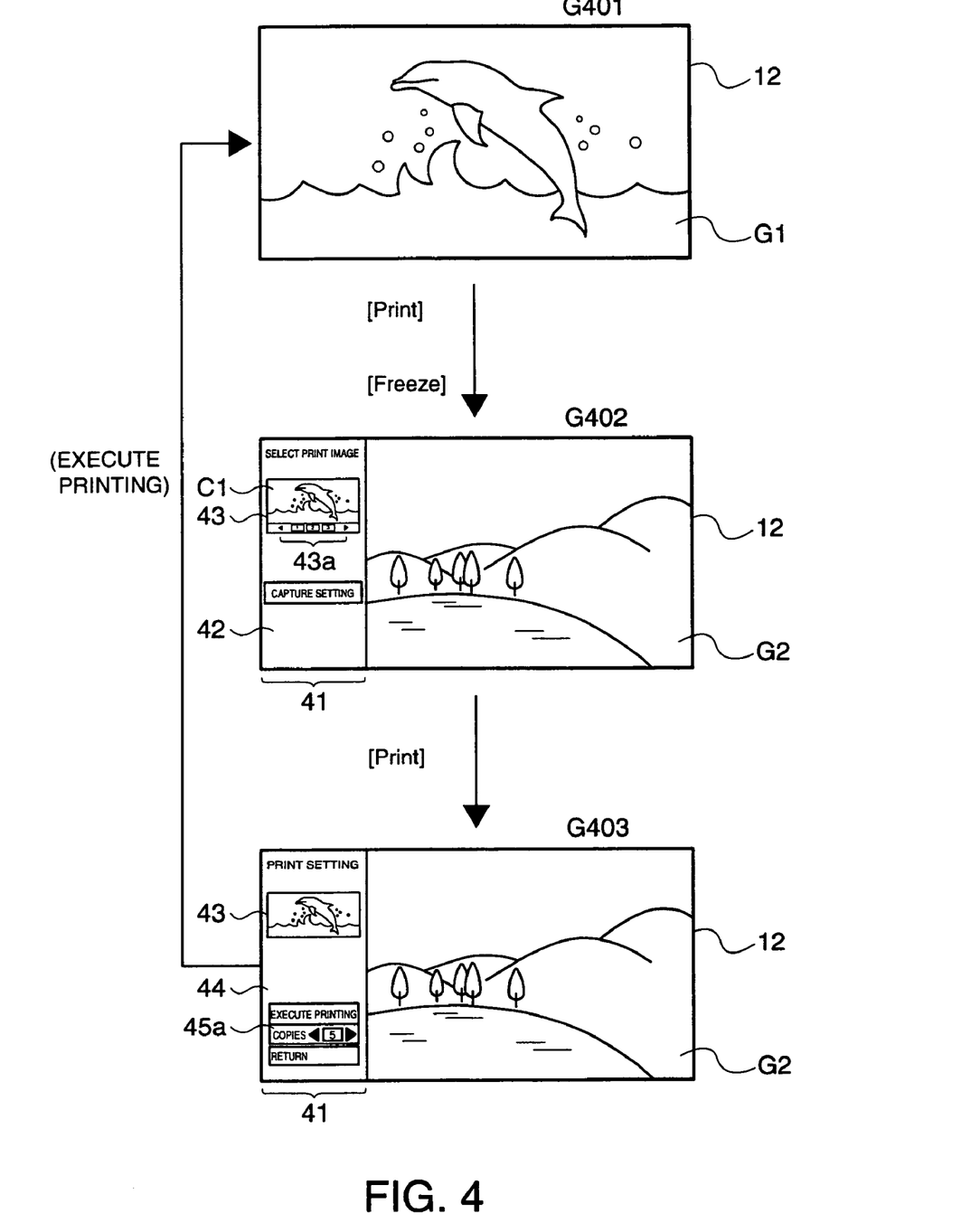
FIG. 4 is a schematic plan view showing a state of a screen displayed when a capture image is printed.

FIG. 4 is a view showing a display screen step by step when the capture image is printed. Hereinafter, the display screen when a capture image C1 is printed will be described with reference to FIG. 4. Initially, a screen G401 shows a state where a TV screen G1 is displayed on the display portion 12.

A screen G402 shows a state where the image of the TV screen G1 is captured in the RAM 25b. In the state of the screen G401, the user presses the "Print" button 31d or the "Freeze" button 31c for an image he wishes to capture. When the button 31d or 31c is pressed, the display control portion 23a temporarily stores, for example, capture images C1 through C3 of three consecutive frames at regular frame number intervals in the RAM 25b. When the capture images are captured, the display portion 12 is split to display a TV screen G2 and a dialog box 41. An aspect ratio of the split TV screen G2 is scaled down to 4:3 from 16:9.

The dialog box 41 includes a "print image selection" screen 42 to display the capture image C1. The "print image selection" screen 42 includes a print image screen 43 to display one of the three captured capture images C1 through C3, and a direction button 43a to select the captured capture images C1 through C3. The capture image (for example, the capture image C1) the user wishes to have printed is selected by an operation on the direction button 43a.

A screen G403 shows a state of a "print setting" screen 44 to make the setting to print the selected capture image C1. The "print setting" screen 44 is first displayed by pressing the "Print" button 31d in the state of the screen G402. Then, the number of print copies is decided in "copy count setting" 45a, and printing of the selected capture image C1 is executed by selecting "Execute Printing".

When "Execute Printing" is selected, the display portion 12 switches to the screen G401 from the screen G403. In short, while the printing is executed, the user can watch the TV screen. The printer 14 continues to execute the print job of the capture image C1 even after the display of the "print setting" screen 44 is turned off. When the printing ends, printed sheets are discharged from the discharge port (not shown) of the printer 14.

Figure 5:
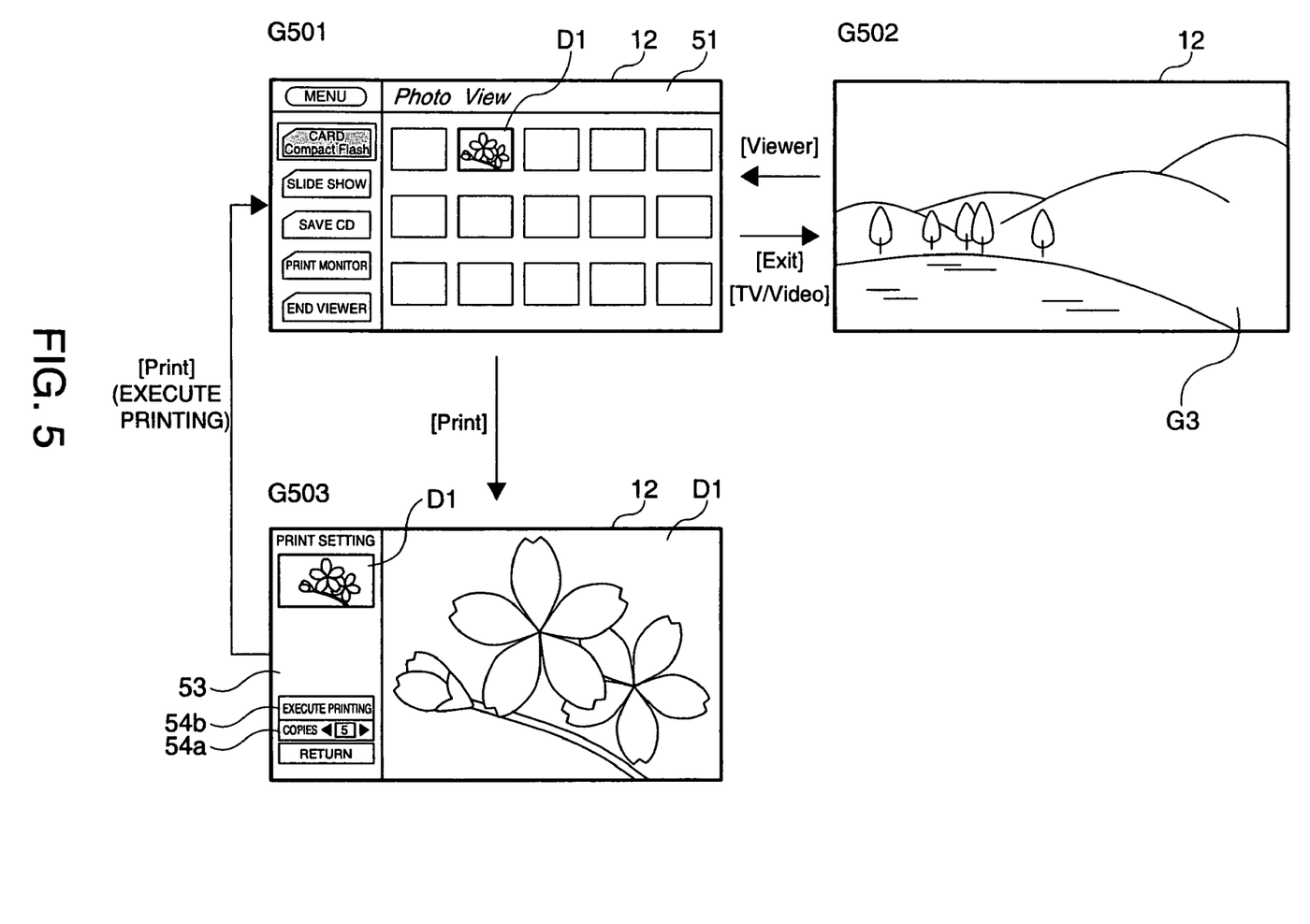
FIG. 5 is a schematic plan view showing a state of a screen displayed when an image read out from a memory card is printed.

FIG. 5 shows a display screen displayed when an image read out from a memory card is printed. The display screen when an image from a memory card is printed will be described with reference to FIG. 5.

A screen G501 shows a photo viewer screen 51 displaying images read out from the memory card slot 11 that are aligned in a smaller size. The screen G501 shows a state where an image the user wishes to have printed is selected among plural images on display by operating the direction buttons 32a through 32d on the remote controller 28.

In addition, by pressing the "Exit" button 31h or the "TV/Video" button 31a in the state of the screen G501, the display is switched to a TV screen G3 of a screen G502, thereby enabling the user to watch TV broadcasting. Further, by pressing the "Viewer" button 31b in the state of the screen G502, the display can be returned to the photo viewer screen 51 of the screen G501.

A screen G503 shows a state of a "print setting" screen 53 to make the print settings. The screen G503 is first displayed by pressing the "Print" button 31d in the state of the screen G501. A selected image is enlarged and displayed on the right of the display portion 12. On the left of the display portion 12 is displayed the "print setting" screen 53 in the form of a dialog box. The number of print copies in "copy count setting" 54a is decided, and printing of an image D1 is started by selecting "Execute Printing" 54b or pressing the "Print" button 31d. When "Return" is selected, the state is returned to the state of the screen G501.

When "Execute Printing" is selected, the display content on the display portion 12 is switched to the screen G501 from the screen G503. In short, while the printing is executed, the user can watch the photo viewer screen 51 or the TV screen G3 by pressing the "TV/Video" button 31a. The printer 14 continues to execute the print job of the image D1 even in the state where the display of the "print setting" screen 53 was turned off. When the printing ends, printed sheets are discharged from the discharge port (not shown) of the printer 14.

Figure 6:
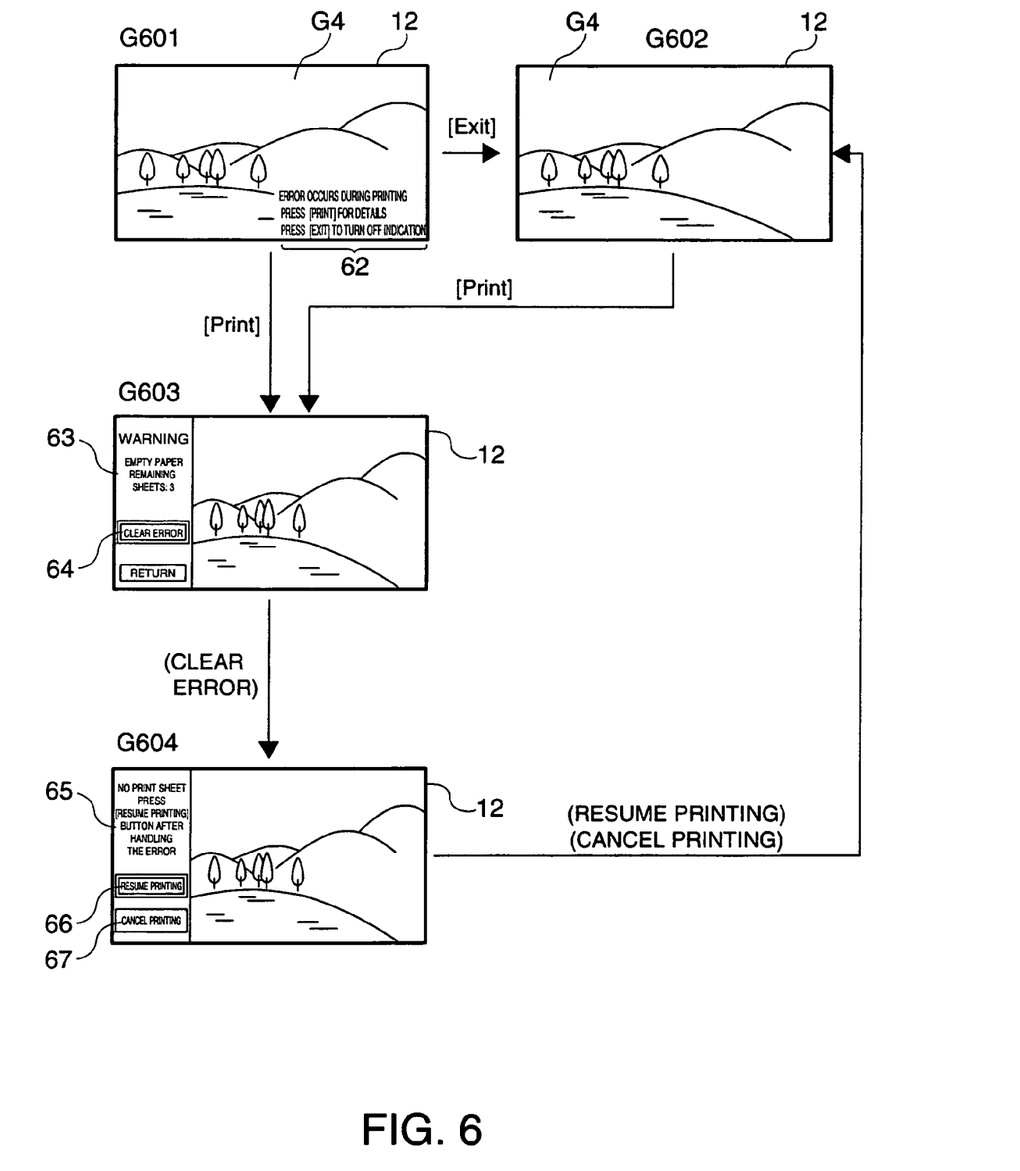
FIG. 6 is a schematic plan view showing a state of a screen displayed when a print error occurs.

FIG. 6 shows a display screen displayed when a print error occurs during printing. Hereinafter, the display screen when a print error occurs will be described with reference to FIG. 6.

A screen G601 in FIG. 6 shows a state where a print error occurs when the user is watching TV broadcasting by returning the screen to the TV screen G4 after the printing of the capture image C1 or the image D1 was executed. Once a print error occurs, a simple error image 62 indicating the occurrence of a print error is displayed at the bottom right of the display portion 12 in a simple manner so as not to interfere with the user watching the TV. In addition, the error indication lamp 14b (see FIG. 1) is lit ON upon occurrence of a print error.

A screen G602 shows a state where the simple error image 62, which is displayed on the screen G601, is turned off. The simple error image 62 can be turned off by pressing the "Exit" button 31h as a first selecting device.

A screen G603 shows a state where an error detail information screen 63 is displayed in the form of a dialog box. The display can be switched to the display of the error detail information image 63 by pressing the "Print" button 31d as a second selecting device in the state of the screen G601. When "Cancel Error" 64 is selected, the screen is switched to a screen G604. When "Return" is selected, the state is returned to the state of the screen G601.

The screen G604 shows a state where a reset guiding screen 65 to provide guiding to reset a print error state is displayed in the form of a dialog box. When "Resume Printing" 66 is selected after the print error is handled, the printing is resumed, and the screen returns to the screen G602. When "Cancel Printing" 67 is selected, the printing is cancelled, and the user can watch TV broadcasting in the state of the screen G602. In addition, when the print error is handled and cleared, or when the printing is cancelled, the error indication lamp 14b (see FIG. 1) is lit OFF.

Hereinafter, the error handling procedure will be described by following the flowchart in FIG. 7.

Figure 7:
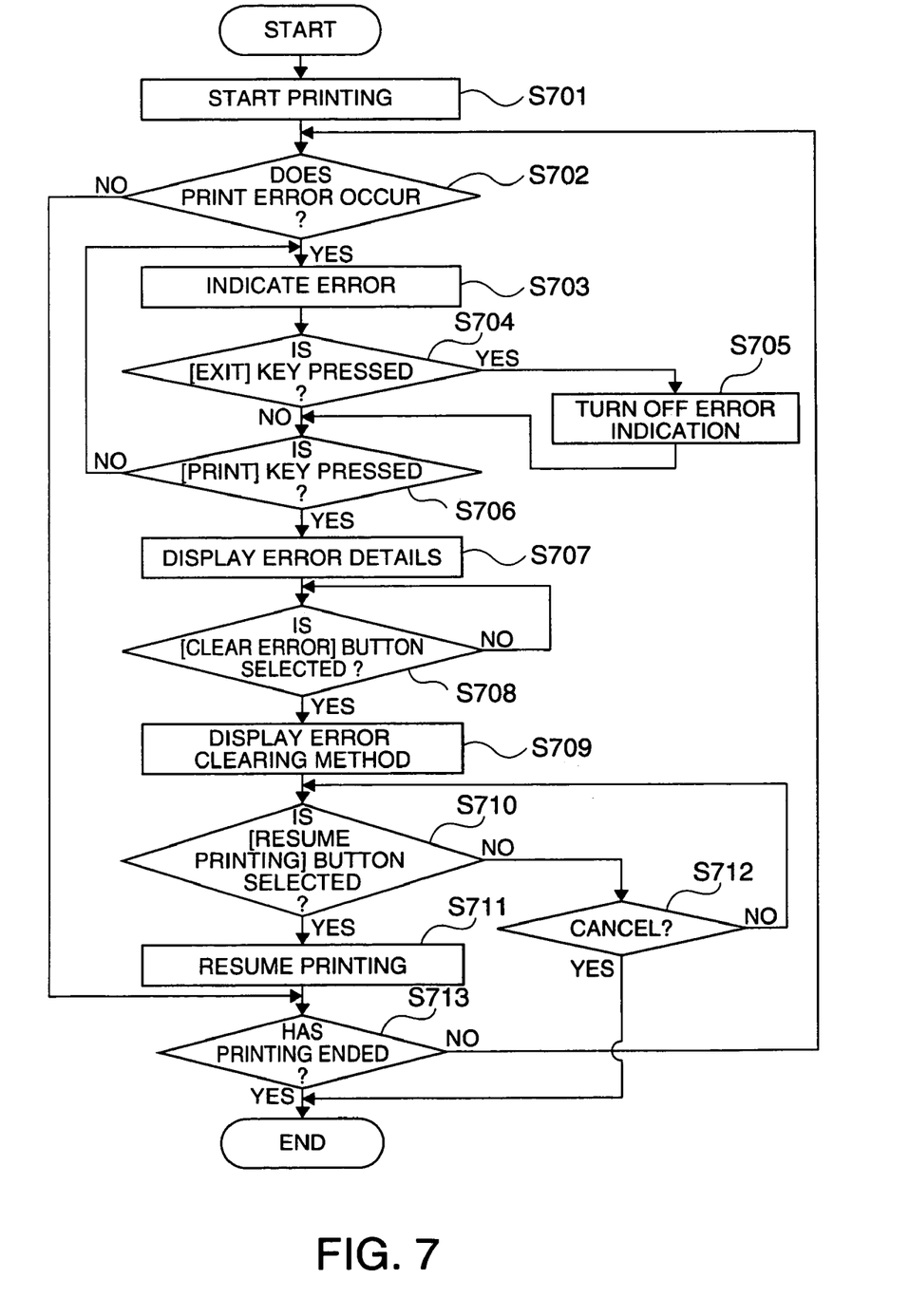
FIG. 7 is a schematic detailing a procedure when a print error occurs.

FIG. 7 is a flowchart detailing an exemplary embodiment of the handling procedure when an print error occurs. Hereinafter, the print error handling procedure will be described with reference to FIG. 6 and FIG. 7. Initially, in Step S701, for example, printing of the capture image C1 or the image D1 is started (see the screen G403 or the screen G503).

In Step S702, the occurrence of a print error during printing by the printer 14 is determined. When a print error has occurred, the flow proceeds to Step S703; otherwise, the flow proceeds to Step S713.

In Step S703, the simple error image 62, indicating the occurrence of a print error, is displayed at the bottom right of the display portion 12 (see the screen G601).

In Step S704, whether the "Exit" button 31h is pressed is determined (see the screen G601). When the "Exit" button 31h has been pressed, the flow proceeds to Step S705. When the "Exit" button 31h has not been pressed, the flow proceeds to Step S706.

In Step S705, the simple error image 62 is turned off (see the screen G602). The user turns off the simple error image 62 from the display portion 12 when he wishes to continue to watch the TV screen G4 by deferring the handling of the print error.

It should be noted that the error indication lamp 14b (see FIG. 1) is kept lit ON from the occurrence of the print error until the print error is cleared. This configuration enables the print error state to be indicated even when the simple error image 62 is turned off from the display portion 12.

In Step S706, whether the "Print" button 31d is pressed is determined (see the screen G601). When the "Print" button 31d has been pressed, the flow proceeds to Step S707. When the "Print" button 31d has not been pressed, the flow proceeds to Step S704.

Even when the simple error image 62 is turned off in Step S705, the print error information is saved, and the flow therefore proceeds to Step S707 when the "Print" button 31d is pressed again (see the screen G603). It may be configured in such a manner that the flow can proceed to Step S707 not only when the "Print" button 31d is pressed, but also when any other button is pressed.

In Step S707, the error detail information image 63 is displayed at the left of the display portion 12 in the form of a dialog box (see the screen G603). As the detail information, for example, "empty paper" is displayed on the screen G603 in FIG. 6.

In Step S708, whether "Clear Error" 64 is selected is determined. When it has been selected, the flow proceeds to Step S709. Otherwise, the state of Step S708 is maintained until "Clear Error" 64 is selected. In this instance, when the "Return" button is operated, the screen returns to the previous screen G601.

In Step S709, the clearing method to reset the print error state is displayed in the form of a dialog box (see the screen G604). As an error clearing method, for example, an instruction to replenish print sheets because no print sheet is in the printer 14 is displayed on the screen G604 in FIG. 6.

In Step S710, whether "Resume Printing" 66 is selected is determined (see the screen G604). When "Resume Printing" 66 has been selected, the flow proceeds to Step S711; otherwise, the flow proceeds to Step S712.

In Step S711, the print job that had been suspended due to the print error is resumed. When the printing is resumed, the screen on the display portion 12 is switched to the screen G602 from the screen G604, thereby enabling the user to watch the TV screen.

In Step S712, whether the print job is cancelled is determined (see the screen G604). When "Cancel Printing" 67 has been selected, the print job is cancelled. When the print job is cancelled, the screen on the display portion 12 is switched to the screen G602 from the screen G604, thereby enabling the user to watch TV broadcasting. When the printing has not been cancelled, the flow proceeds to Step S710.

In Step S713, whether the printing has ended is judged. When the printing has not ended, the flow proceeds to Step S702 to monitor the occurrence of a print error in the printer 14. When the printing has ended, the print job is terminated.

Figure 8:
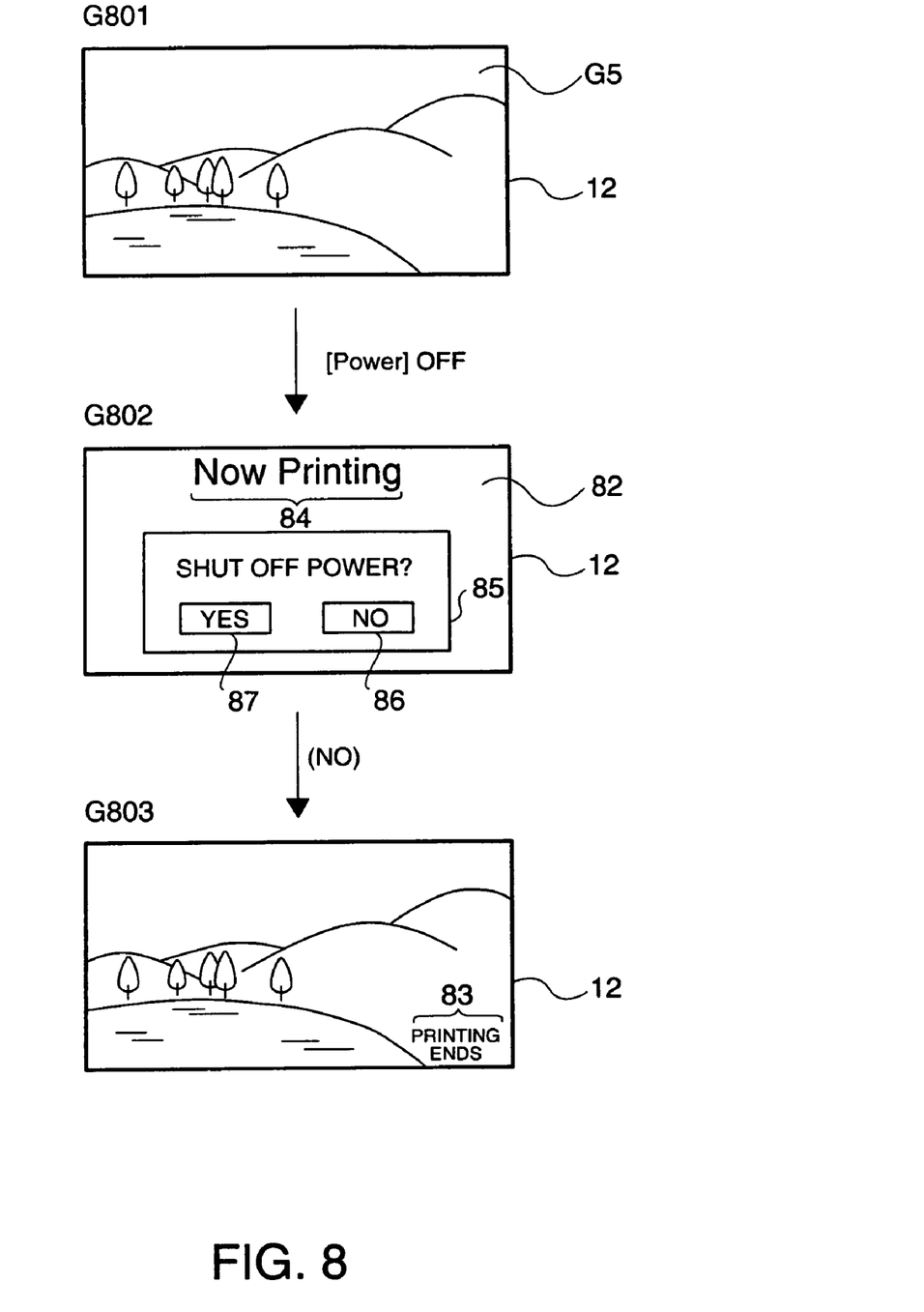
FIG. 8 is a schematic plan view showing a state of a screen displayed when the power supply switch is switched OFF during a print job.

FIG. 8 shows a display screen displayed when the power supply switch is switched OFF erroneously during a print job. Hereinafter, the display screen when the power supply switch ("Power") 34 or the main power supply switch 15 is switched OFF during a print job will be described with reference to FIG. 8. In this exemplary embodiment, the display screen when the power supply switch ("Power") 34 is switched OFF will be described.

A screen G801 shows a state where the user is watching TV broadcasting by having a TV screen G5 displayed on the display portion 12. The screen G801 is the state where the simple error image 62 displayed upon occurrence of a print error as described above is turned off.

A screen G802 shows a state where a dialog box 82, including a warning image, is displayed when the power supply switch ("Power") 34 is switched OFF while the simple error image 62 is kept turned off.

A screen G803 shows a state where the printing has ended by selecting a "No" button 86 as a third selecting device to let the printing be continued. When the printing ends, "Printing Ends" 83 is displayed at the bottom right of the display portion 12. When a "Yes" button 87 as a fourth selecting device is selected in the state of the screen G802, the power supply of the rear projector 1 is shut OFF at that point in time.

Hereinafter, the handling procedure when the power supply switch ("Power") 34 is switched OFF during a print job will be described by following the flowchart in FIG. 9.

Figure 9:
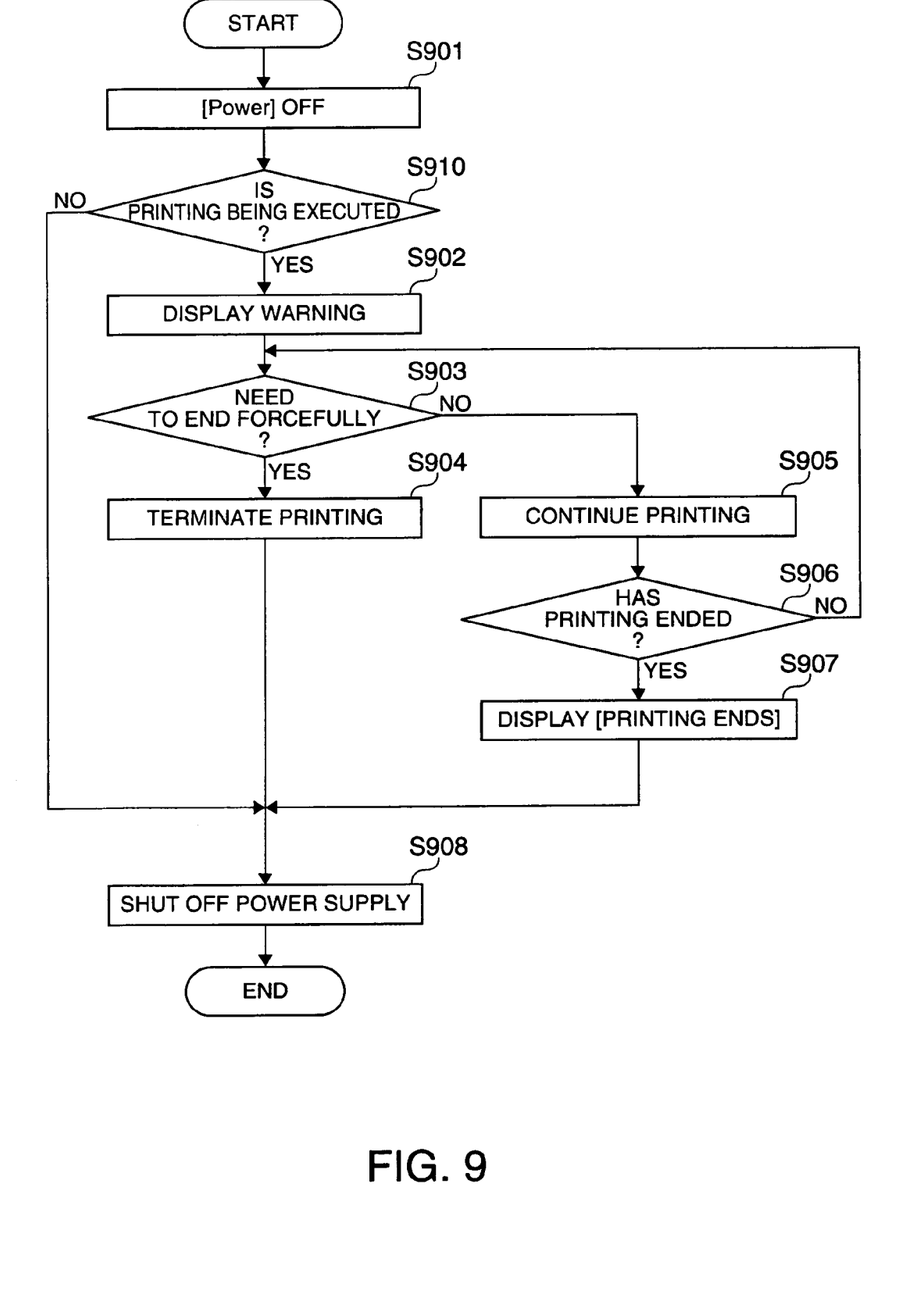
FIG. 9 is a schematic detailing the procedure when the power supply switch is switched OFF during a print job.

FIG. 9 is a flowchart detailing an exemplary embodiment of the handling procedure when the power supply switch is switched OFF during a print job. Hereinafter, the print error handling procedure will be described with reference to FIG. 8 and FIG. 9. The user is now watching a TV screen G5 by turning off the simple error image 62 displayed after the error occurred during a print job (see the screen G801).

In Step S901, the power supply switch ("Power") 34 is switched OFF.

In Step S910, whether the print job is being executed is determined. When the print job is being executed, the flow proceeds to Step S902; otherwise, the flow proceeds to Step S908.

In Step S902, the warning image, indicating the printing is being executed, is displayed on the display portion 12 in the form of a dialog box 82. The dialog box 82 includes a warning image, "Now Printing" display 84, and an option display 85 as to whether the power supply is to be shut OFF or not.

In Step S903, whether the power supply is forcefully shut OFF is determined. When the power supply is forcefully shut OFF even the printing is being executed, ("YES"), the flow proceeds to Step S904. When the power supply is not shut OFF ("NO"), the flow proceeds to Step S905 (see the screen G802).

In Step S904, the print job is terminated. Even when the print job is suspended in the middle due to a print error, the printing is terminated in this state, and the power supply of the printer 14 is shut OFF by the power supply control portion 22. Also, the printing is terminated even when the printing is being executed without any print error, and the power supply of the printer 14 is shut OFF in the same manner.

In Step S905, the print job is continued. When the print error is occurring, an action is taken to clear the error and the printing is resumed.

In Step S906, whether the printing has ended is determined. When the printing has ended, the flow proceeds to Step S907. When the printing has not ended, the flow proceeds to Step S903.

In Step S907, the "Printing Ends" 83, indicating that the printing has ended, is displayed at the bottom right of the display portion 12. The user can confirm that the printing has ended from the display of the "Printing Ends" 83.

In Step S908, the power supply of the rear projector 1 is shut OFF after the printing is terminated forcefully or the print job ends.

The handling procedure when the power supply switch 34 is switched OFF during a print job has been described with reference to FIG. 8 and FIG. 9. It should be noted, however that, it is configured in such a manner that the warning image is displayed when the power supply switch 34 is switched OFF not only during a print job, but also while the capture image is stored in the RAM 25b, so that the power supply is not shut OFF immediately. In this case, the "Now Printing"

display 84 shown on the screen G802 in FIG. 8 is changed to the warning display indicating that the capture image is stored, and the option display 85 allowing the user to select whether the power supply is to be shut OFF or not is also displayed. Hence, the capture image that has not been printed will not be deleted instantly, and the user is allowed to select whether the capture image is to be printed or not at this point in time. When the user wishes to have the capture image printed, the flow proceeds to the printing step; otherwise, the power supply is shut OFF.

As has been described, advantages as follows can be attained by the exemplary embodiments.

(1) According to the exemplary embodiments, when a print error occurs during printing, not only can the simple error image 62 indicating a print error be displayed at the bottom right of the display portion 12, but also the simple error image 62 can be turned off temporarily. Hence, the user can easily understand the occurrence of the print error, and when he wishes to continue to watch TV broadcasting by deferring the handling of the print error, he can turn off the display of the simple error image 62 so that it does not interfere with the user watching TV broadcasting. Meanwhile, the error indication lamp 14b is lit ON, too, upon occurrence of the print error. Hence, even after the simple error image 62 is turned off, the user can understand that the print error is occurring.

(2) According to the exemplary embodiments, when the power supply switch ("Power") 34 is switched OFF erroneously during printing, not only can the warning image, indicating that the printing is being executed, be displayed on the display portion 12, but also the user can select the "Yes" button 87 or the "No" button 86 to shut OFF the power supply or keep it ON. Hence, printing can be executed to the end without being cancelled.

(3) According to the exemplary embodiments, when the power supply switch 34 is switched OFF while the capture image C1 is accumulated in the RAM 25b, not only can the warning image be displayed on the display portion 12, but also the user can select whether the power supply is to be shut OFF or not. Hence, the power supply is not shut OFF immediately, so that the printing can be resumed without the necessary capture image being deleted.

Figure 10:
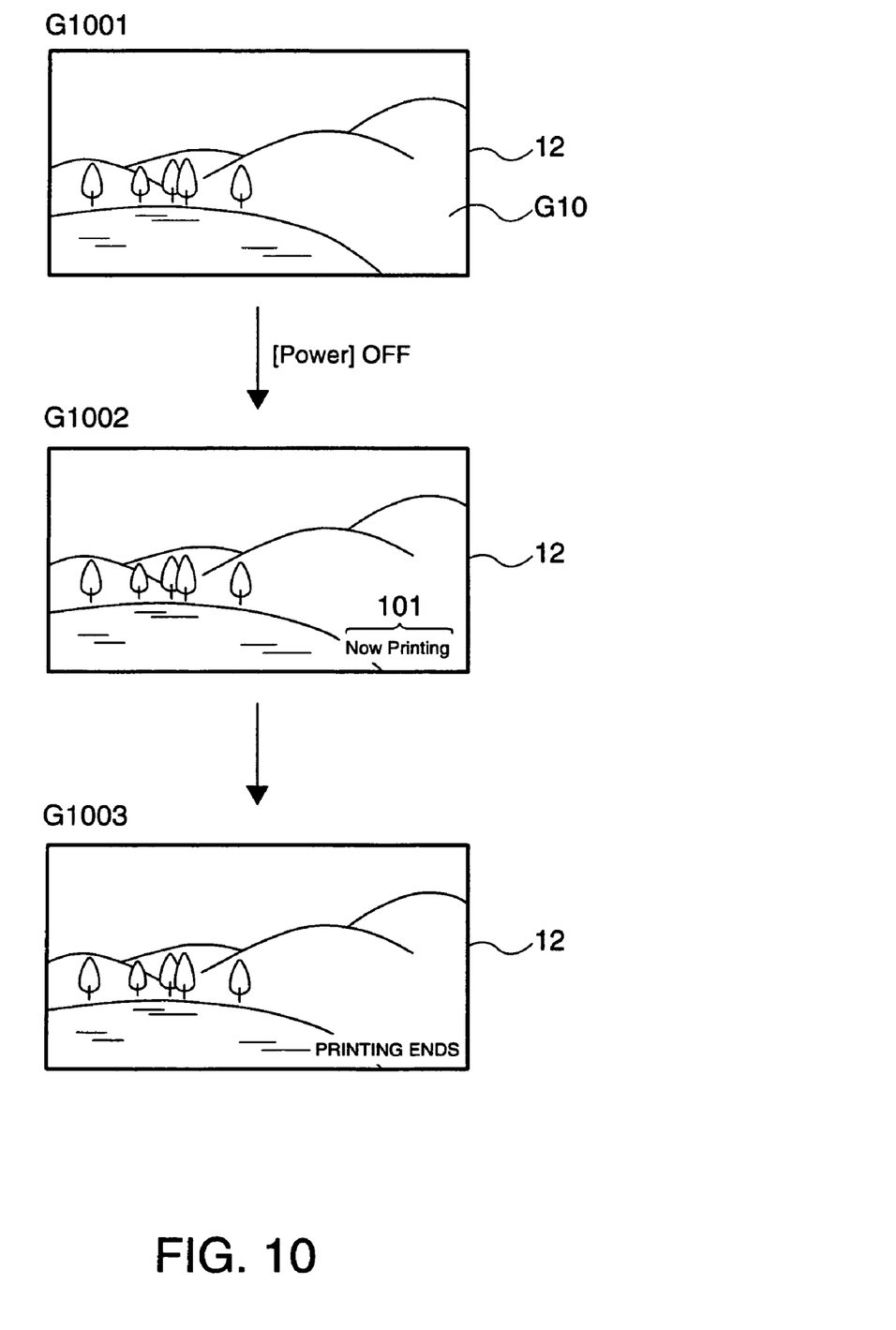
FIG. 10 is a schematic plan view showing an exemplary modification of the state of a screen displayed when the power supply switch is switched OFF during a print job.

The exemplary embodiments are not limited to the description as above, and can be implemented in the manner as follows. In a first modification of the exemplary embodiments, when the power supply switch ("Power") 34 is switched OFF during a print job, the dialog box 82 is displayed on the display portion 12 to display the warning image notifying the user that printing is being executed, as well as an option display as to whether the power supply is to be shut OFF or not, so that the user can make a choice. However, when the power supply switch ("Power") 34 is switched OFF during a print job, it may be configured alternatively in such a manner that, as is shown in FIG. 10, a warning image of "Now Printing" 1001 is displayed at the bottom right of the display portion 12 to prevent the power supply from being shut OFF. A screen G1001 shows a state where the user is watching a TV screen G10 during a print job. A screen G1002 shows the warning image when the power supply switch ("Power") 34 is switched OFF. A screen G1003 shows a state when printing ends. In this case, the warning image, "Now Printing", is displayed during a print job, and the power supply of the rear projector 1 is cut when a predetermined time has passed since the printing ended.

In a second modification of the exemplary embodiments, the simple error image 62, displayed upon occurrence of a print error, is switched to the TV screen G4 by pressing the "Exit" button 31h. However, it may be configured alternatively in such a manner that the image is turned off automatically when a predetermined time has passed since the simple error image 62 was displayed. The simple error image 62 that automatically turned off may be displayed when the channels are switched or at the timing of some switching operations.

Also, the menu screen may be configured in such a manner that the user can select whether the simple error image 62 is turned off by the user or automatically upon occurrence of a print error.

Further, the simple error image 62 may be displayed periodically at regular time intervals after it is turned off on the screen.

In a third modification of the exemplary embodiments, when the power supply switch ("Power") 34 is switched OFF during printing, the printing is not suspended suddenly. However, it may be configured alternatively in such a manner that, for example, a CD-R (Compact Disc Recordable) or the like is connected to the external input terminal of the rear projector 1, so that when the power supply switch ("Power") 34 is accidentally switched OFF while the data is being delivered, a warning image is displayed so as not to shut OFF the power supply. When configured in this manner, it is possible to prevent data read from the CD-R from being deleted.

In a fourth modification of the exemplary embodiments, the warning image is displayed when the power supply switch ("Power") 34 is switched OFF during printing, so that the power supply is not shut OFF. However, it may be configured alternatively in such a manner that when the power supply switch ("Power") 34 is switched OFF, the power supply of the display device 23 is shut OFF while the printer 14 continues the printing until it ends, after which the power supply of the printer 14 is shut OFF.

In a fifth modification of the exemplary embodiments, the capture image C1 is saved in the RAM 25b by pressing the "Print" button 31d or the "Freeze" button 31c while the user is watching TV broadcasting on the TV screen. However, it may be configured alternatively in such a manner that the capture images can be saved in the RAM 25b to its full even when a print error is occurring.

In a sixth modification of the exemplary embodiments, the display portion 12 includes the rear projector 1. However, alternatively, it may include other display elements, such as a CRT (cathode ray tube) and a plasma display.

The invention claimed is:

1. An image display device, used with a printer and at least one or more selecting devices, comprising:
   a display portion on which an image including TV broadcasting is displayed,
   a memory to store image data of the image displayed on the display portion,
   a display control portion to display an error image, when an error occurs in the printer used to print the image data recorded in the memory, the error image indicating an occurrence of the error on the display portion;
   a first selecting device to allow a user to turn off the error image,
   the error image being a simple error image;
   a second selecting device to allow the user to select to display an error detail information image;
   the first selecting device allowing the user to turn off the simple error image; and
   the display control portion performing processing following a command corresponding to a selection content from the first or the second selecting device and the display control portion turning off the error image displayed on the display portion following a turn-off command from the first selecting device while information of the error is saved.

2. The image display device according to claim 1,
the display control portion displaying the simple error image on the display portion in a predetermined area other than a center portion.

3. The image display device according to claim 1, further comprising:
an external memory device;
the image including an image based on image data read out from the external memory device.

4. The image display device according to claim 1, further comprising:
a third selecting device to allow the user to select to shut OFF a power supply of the image display device; and
a fourth selecting device to allow the user to select not to shut OFF the power supply when a power supply switch to shut OFF the power supply of the image display device is switched OFF while the image data is recorded in the memory;
the display control portion displaying, when the power supply switch is switched OFF, a warning image indicating that the image data is accumulated in the memory, and performing processing following a command corresponding to a selection content from the third or the fourth selecting device.

5. The image display device according to claim 1, further comprising:
an error notifying portion, provided apart from the display portion, to notify, when an error occurs in the printer, the user of an occurrence of the error.

6. An image display device, used with a printer and at least one or more selecting devices, comprising:
a display portion on which an image including TV broadcasting is displayed,
a memory to store image data of the image displayed on the display portion,
a display control portion to display an error image, when an error occurs in the printer used to print the image data recorded in the memory, the error image indicating an occurrence of the error on the display portion;
a first selecting device to allow a user to turn off the error image,
the display control portion turning off the error image displayed on the display portion following a turn-off command from the first selecting device while information of the error is saved;
a power supply switch to shut OFF a power supply of the image display device, power supplies of the display portion and the printer being shut OFF in association with switching OFF of the power supply switch; and
a power supply control portion to control the power supply of the image display device when the power supply switch is shut OFF,
the power supply control portion, upon determining that the printer is executing a print job when the power supply switch is switched OFF, the display control portion displaying a warning image indicating that the print job is being executed on the display portion, and issuing a command to the power supply control portion not to shut OFF the power supply of the image display device.

7. The image display device according to claim 6,
the display control portion displaying the error image again on the display portion in a case where the information of the error is saved when the power supply switch is switched OFF while the error image is kept turned off.

8. The image display device according to claim 6, further comprising:
a second selecting device to allow the user to select to let the print job be continued when the power supply switch is switched OFF; and
a third selecting device to allow the user to shut OFF the power supply of the image display device;
the display control portion performing processing following a command corresponding to a selection content from the second or the third selecting device.

9. The image display device according to claim 6,
the display control portion displaying the simple error image on the display portion in a predetermined area other than a center portion.

10. The image display device according to claim 6, further comprising:
an external memory device;
the image including an image based on image data read out from the external memory device.

11. The image display device according to claim 6, further comprising:
an error notifying portion, provided apart from the display portion, to notify, when an error occurs in the printer, the user of an occurrence of the error.

12. An error handling method for an image display device, used with a printer and at least one or more selecting devices, comprising:
(a) determining whether an error occurred in the printer used to print image data stored in a memory;
(b) displaying on the image display device, upon an occurrence of the error, a simple error image indicating the occurrence of the error on a display portion on which an image including TV broadcasting is displayed;
(c) allowing a user to select, from a second selecting device whether or not to display an error detail information image;
(d) allowing the user to turn off, from a first selecting device, the simple error image;
(e) turning off the simple error image displayed on the display portion when a command is issued from the first selecting device while information of the error image is saved; and
(f) processing being performed by the display portion following a command corresponding to a selection content from the first or the second selecting device.

* * * * *